April 17, 1973 W. W. COOPER IV 3,728,256
CROSSFLOW CAPILLARY DIALYZER
Filed June 22, 1971 2 Sheets-Sheet 1

INVENTOR.
WILLIAM W. COOPER IV
BY Crowley & Stevens
CROWLEY AND STEVENS
ATTORNEYS

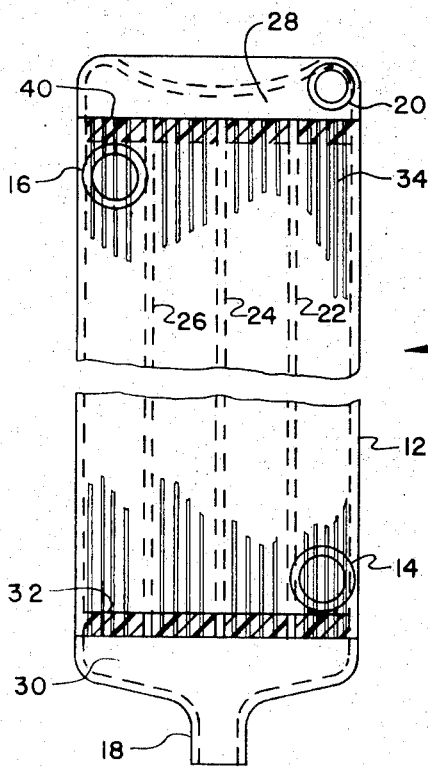
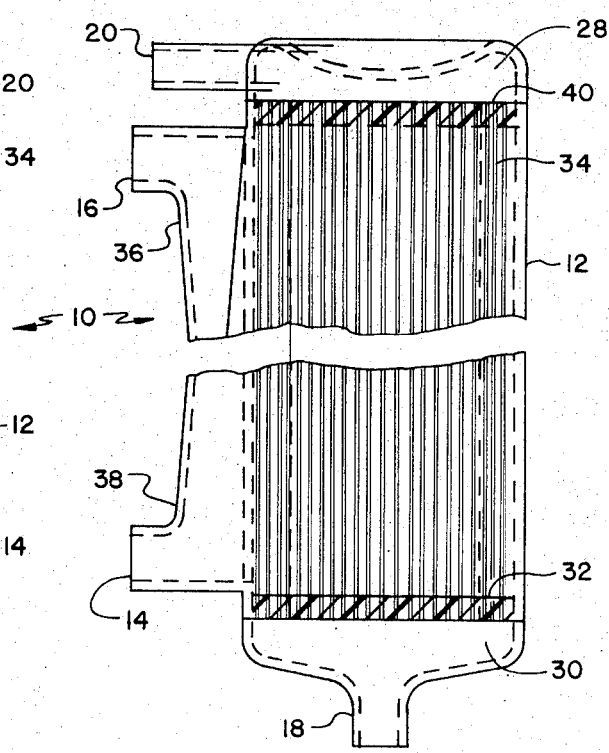
FIG. 3                    FIG. 4
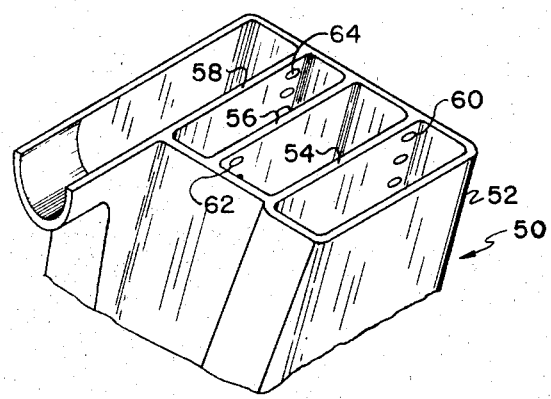
FIG. 5

United States Patent Office 3,728,256
Patented Apr. 17, 1973

3,728,256
CROSSFLOW CAPILLARY DIALYZER
William W. Cooper IV, Sudbury, Mass., assignor to Abcor, Inc., Cambridge, Mass.
Filed June 22, 1971, Ser. No. 155,471
Int. Cl. B01d 13/00, 31/00
U.S. Cl. 210—22
24 Claims

ABSTRACT OF THE DISCLOSURE

A crossflow capillary dialyzer particularly useful for the dialyzation of body fluids, such as blood, which dialyzer is characterized by a simple and economic design which promotes the velocity of dialyzate as it flows perpendicular to the capillary fibers in the dialyzer, and which dialyzer comprises a plurality of generally parallel capillary semipermeable membrane fibers enclosed at both ends in potted headers within a shell, and wherein a system of baffles is employed within the dialyzer shell, which baffles provide a tortuous or zig-zag flow path for the dialyzate as it crossflows over the capillaries.

BACKGROUND OF THE INVENTION

A number of semipermeable membrane devices employing hollow capillary fibers composed of a semipermeable membrane material have been proposed for the separation of fluids, such as the separation of a variety of compounds from liquid solutions to include body fluids; for example, the dialysis of blood. Typically, such dialysis devices are shown in U.S. Pats. 3,228,876, 3,228,877 and 3,442,002 wherein a plurality of bunched capillary tubes potted usually at each end in headers are secured within a shell, and a liquid, such as blood, introduced into the header chamber is passed through the interior of the capillary fibers. A dialyzate solution is introduced exterior of the fibers in the shell and flows about the outside of the capillary fibers, thereby providing a permeate-rich dialyzate fraction and a permeate-poor fraction; that is, blood cleaned of metabolic waste components, such as urea and creatinine.

In such prior art devices, the advantages of a crossflow of either the feed liquid or the sweep liquid are well known. Such crossflow in capillary devices is usually accomplished by introducing the dialyzate solution through a central perforated tube about which the capillary tubes are bunched; for example, in a manner as shown in U.S. Pat. 3,436,661 and in U.S. Pat. 3,528,553. The introduction of a dialyzate from a central porous distributor tube located within a surrounding bundle of capillary fibers is one means of obtaining an effective crossflow to promote efficient contacting of the capillary fibers by the dialyzate solution and to permit material removed from the blood, such as urea, to be removed by the dialyzate stream. However, in such deigns, the velocity falls off as the dialyzate moves away from the central tube resulting in increased resistance and loss of efficiency.

In practice, such designs though they may function well, have suffered from economic difficulties associated with high labor and manufacturing costs and manufacturing difficulties. Such prior art capillary devices employed as a capillary artificial kidney often require a dialyzate flow rate of about 2,000 ml. per minute or greater in order to achieve maximum urea and creatinine clearances. Clinical data has shown that in such capillary devices the urea resistance reaches an asymptotic value between 45 and 50 minutes per centimeter which corresponds to a dialysance of between 150 and 160 ml. per minute for such capillary devices at a blood flow rate of about 200 ml. per minute. The corresponding overall resistance for creatinine transport is 85 minutes per cm. which results in a dialysance of 115 ml./min. at a blood flow rate of 200 ml./min. Although these dialysances are usually adequate, it would be desirable to achieve such dialysance at lower dialyzate flow rates so that a capillary artificial kidney device could be employed at high efficiency with a once-through artificial kidney machine. It is therefore desirable to improve the urea and creatinine clearances in artificial kidney capillary devices. It is also advantageous to reduce the material and labor cost of the construction of such capillary devices so that such devices may be manufactured at reasonable cost and be made available at competitive prices.

SUMMARY OF THE INVENTION

I have found that an efficient and economical crossflow capillary dialyzer device may be prepared by a simple and economically manufactured low labor cost design, which design also achieves an improved tortuous flow path for a crossflow of the dialyzate solution. My device permits the dialyzate in artificial kidney devices to flow along a more tortuous path at a higher velocity for a given overall flow rate. My crossflow capillary devices are designed more particularly by baffling the dialyzate flow channel in a particular manner to permit such tortuous flow paths.

More particularly, my invention concerns a baffled crossflow artificial kidney capillary device and process, which device is of a simple and economic design, but which enhances the efficiency of the device by increasing the velocity of a liquid sweep stream, such as a dialyzate, as it flows in a derection; e.g., substantially perpendicular to the capillary fibers.

My crossflow dialyzer device comprises in combination: (1) an outer shell; (2) a plurality of capillary membrane fibers disposed witin the shell, the fibers arranged generally parallel to each other within the shell, the fibers defining a feed zone ad a permeate zone, the membrane wall of the fibers selected and adapted to separate a multicomponent feed stream into a permeate-rich and a permeate-lean fraction; (3) means to introduce a multicomponent feed stream, such as blood, into the feed zone, typically into one end and the interior of the fibers; (4) means to withdraw a permeate-lean fraction, such as cleaned blood, from the feed zone, typically from the opposite end of the fibers; (5) means to introduce a fluid sweep stream, such as a dialyzate solution, into the permeate zone, typically exterior of the fibers and to permit the dialyzate to flow about the fibers; (6) means to withdraw a permeate-rich fraction, including the sweep fluid, from the permeate zone; and (7) baffle means wherein one or more baffle elements are disposed within the shell, the baffles positioned to divide the fibers within the shell into a plurality of separate chambers, which chambers are in fluid-flow communication with each other throughout the shell, the baffles so arranged to provide a tortuous, but patricularly, a sinusoidal or zig-zag flow path for the sweep fluid as the fluid cross-flows; e.g., substantially perpendicular to the fibers.

In one embodiment of my device, the baffles are positioned to increase the velocity of a dialyzate sweep stream as it crossflows over the plurality of capillaries within the device. A particular feature of my device is the low cost and ease of fabrication of the outer shell element containing the desired system of baffles; for example, by molding the shell element of a rigid medically accepted polymeric material, thereby eliminating high cost labor and manufacturing difficulties associated with some prior art devices.

My device will be described in paritcular in connection with its fabrication and use as an artificial kidney; however, I recognize that my device may be employed for the separation of a wide variety of multicomponent streams through semipermeable membrane techniques; for example, such as processes set forth in the prior art references. I have found that in one form of my device, the employment of substantially parallel baffles dividing the shell element into at least three, four, five or more substantially equal dimension chambers with a plurality of capillary fibers within each chamber permits the construction of a highly efficient dialyzer device. In one form, the baffles extend in an alternating sequence from the interior walls of the shell element inwardly; for example, to a position over 50 percent of the internal dimensions of the shell. The baffle elements are then arranged substantially and generally parallel to the capillary fibers within each separate chamber formed by the baffles. In another form, the baffles extend from one to the other interior side walls of the shell to provide a series of chambers in the shell and fluid-flow communication between the chambers provided by flow passages in the baffle walls. In such devices, the dialyzate crossflow would be generally sinusoidal.

I have found that in comparison with my device, prior art baffle-free crossflow or parallel dialyzate-flow devices result in dialyzate by-passing the capillaries which drastically reduces the urea dialysis in artificial kidney operations. By-passing in parallel flow capillary devices can be eliminated only by very close packing of the capillary fibers. However, such close packing impairs the ability of the potting compound to coat effectively the capillary surfaces, and thus, substantially increases the risk of leakage as the capillary fibers are potted at one or both ends of a resinous-type pottting compound. Moreover, I have found that such close packing often causes the capillary fibers in the potted ends to become distorted when they swell during wetting, and that this distortion becomes a factor in blood clotting in artificial capillary kidney devices. My baffle device with its flow pattern of dialyzate permits the dialyzate to contact the capillary fibers in an efficient manner without requiring very close packing of the capillary fibers, although close packing may be used with my baffles.

My crossflow dialyzer device will be described in particular in reference to a square-type shell element; however, it is recognized that other types and configurations of shells may be employed. The square rectangular shell-type enclosure described is preferred, since it is easily molded and allows the capillary fibers to be laid in each separate chamber of the shell. For example, deacetylated cellulose acetate fibers, as they are drawn from a deacetylation train may be laid in the square chambers, and the ends of the fibers then potted. Also, this design permits several different types of capillary fibers, if desired, to be placed in the same crossflow dialyzer. A plurality of different polymers for the capillary fibers in separate chambers permits the construction of a single cross-flow capillary device in which the removal of various molecules; for example, small molecules, middle-sized molecules and water, is optimized.

My invention also comprises a process for the separation of a multicomponent fluid feed stream, particularly a liquid stream, into a permeate-rich and permeate-lean fraction by employing a plurality of capillary fibers, the fibers composed of a polymeric material adapted to affect the separation of the multicomponent feed stream by a semipermeable membrane technique at either low ultrafiltration or high reverse osmosis pressures, and wherein a fluid sweep stream, particularly a liquid stream, is cross-flowed; for example, in a path substantially perpendicular to the capillary fibers, the improvement which comprises in the process: flowing the fluid sweep stream in a zig-zag or tortuous; for example, sinusoidal flow path, as the sweep stream crossflows; for example, flows substantially perpendicular to the plurality of capillaries. More particularly, my process comprises providing a series of separate chambers and containing within each chamber a plurality of capillary fibers, the chambers in liquid-flow communication with each other, but separated by a series of baffles within a common shell, and flowing a liquid dialyzate stream where the feed stream is a body fluid, such as blood, in a sinusoidal fashion from and through one to the other chamber. My process permits the improved dialysis of a body fluid, such as blood, from which low molecular weight poisonous materials are to be removed.

DESCRIPTION OF THE DRAWINGS

FIG. 3 is a cross-sectional view of my crossflow capillary dialyzer taken along the lines 3—3 of FIG. 1;

FIG. 4 is a cross-sectional view of my crossflow capillary dialyzer taken along the line 4—4 of FIG. 1; and FIG. 5 is an enlarged cut-away view of another shell element illustrating a different form of baffles than FIG. 2.

DESCRIPTION OF THE EMBODIMENTS

Figure 1:
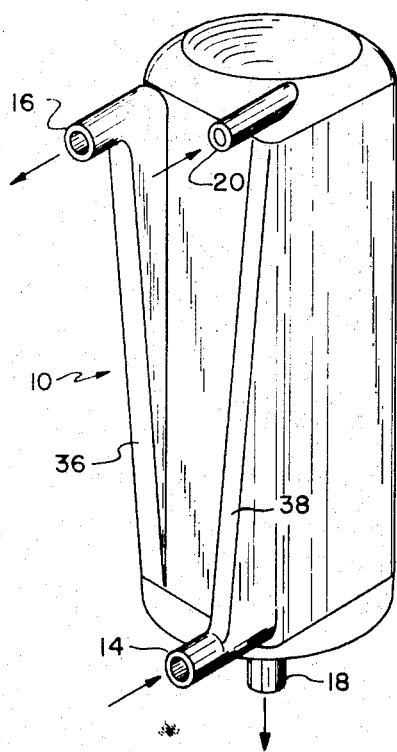
FIG. 1 is a perspective view of my crossflow capillary dialyzer device.

A crossflow dialyzer device 10 having an outer shell element 12 composed of; for example, a hard plastic, such as a medically accepted styrene-acrylonitrile plastic prepared by a molding process, contains a dialyzate inlet 14, a dialyzate outlet 16, a blood inlet 20, and a blood outlet 18.

Figure 2:
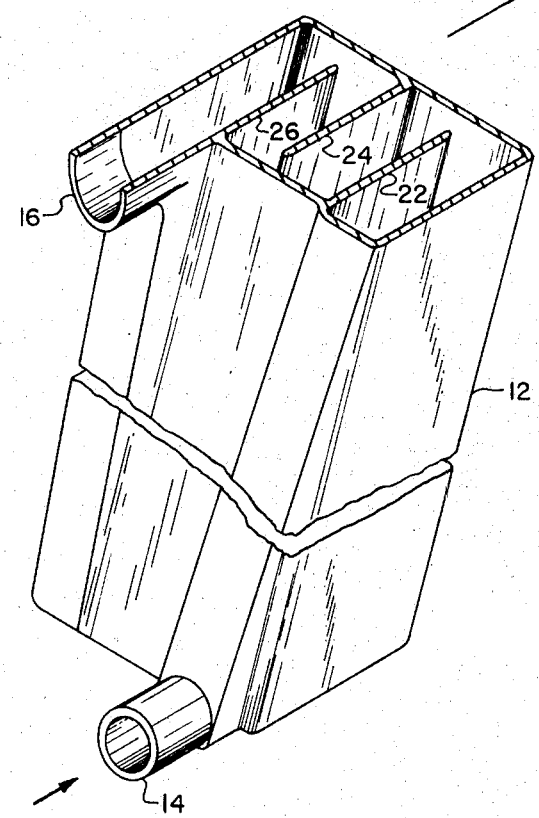
FIG. 2 is an enlarged cut-away view along the line 2—2 of FIG. 1 of the shell element of my crossflow capillary dialyzer, together with an illustrative sinusoidal flow pattern shown for the dialyzate through said baffled shell element.

FIG. 2 shows the shell element 12 as fabricated without the capillary fibers therein and illustrates as an integral part of the shell a series of generally parallel baffles 22, 24 and 26 dividing the shell element into a plurality of substantially rectangular-type uniform chambers, each of the chambers being in liquid-flow communication with the other chambers at alternating ends of the baffles so as to impart a generally sinusoidal flow path for dialyzate introduced into inlet 14 of the shell element 12. The sinusoidal flow path is illustrated by the dialysis flow path shown in FIG. 2.

FIGS. 3 and 4 are general cross-sectional views of my crossflow capillary dialyzer of FIG. 1 showing a plurality of capillary fibers 34 arranged in generally parallel groups within the chamber as defined by the baffles 22, 24 and 26 within the shell element 12. The capillaries are secured in a fluid-tight manner in a hardened resin, such as medically accepted silicone elastomer headers 32 and 40 at each end. The capillaries in the headers have exposed or open ends to permit passage from a blood inlet chamber 28 into the interior of the capillary fibers 34, and to permit the withdrawal of blood from a blood outlet chamber 30 at the opposite end of the capillary fibers. Typically, the capillary fibers in an artificial kidney device may comprise deactylated cellulose acetate capillary fibers; for example, having an outside diameter of from 10 to 300 microns, such as 10 to 100 microns, and an internal diameter of 1 to 50 microns, such as 2 to 15 microns.

A tapered dialyzate inlet channel 38 and a tapered dialyzate outlet chamber 36 are provided to permit the introduction and withdrawing of the dialyzate solution substantially uniformly and perpendicular to the plurality of capillary fibers within the shell. Blood inlet chamber 28 is convexly shaped and blood inlet 20 positioned to permit the tangential entry of the blood into the blood inlet chamber 28, thereby reducing clotting in the open ends of the capillary fibers. The blood outlet chamber 30 is funnel-shaped and blood outlet 18 is positioned generally axially with the open end of the capillary fibers to permit the rapid withdrawal of the blood after dialysis without damage to the blood cells.

FIG. 5 shows an alternate embodiment of a shell element 50 for use in the dialyzer 10, the element having an exterior 52, with an interior divided into a series of chambers by baffles 54, 56, and 58 which extend from one to the opposite walls within the shell. The baffles have a plurality of flow passages 60, 62 and 64 therein, the flow passages' position alternating in each baffle to provide the desired sinusoidal flow pattern shown in FIG. 2. The flow passages are illusttrated by a series of circular holes, but may be passages arranged in any desired shape or position so as to obtain a tortuous flow path and communication between the chambers.

In operation, as an artificial kidney, blood having urea and creatinine substances therein is introduced tangentially through blood inlet 20 into blood chamber 28, the blood passes into the open ends of the capillary fibers 34 and is withdrawn from the opposite open ends into outlet chamber 30 and removed from blood outlet 18. While blood is so passing through the interior of the capillary fibers, a liquid dialyzate stream comprising a liquid stream approximately isomolar with blood, but containing much lower or even zero concentration of metabolic wastes, like creatinine and urea, is introduced into the dialyzate inlet 14 and into the tapered chamber 38 so that the liquid dialyzate stream is introduced and flows substantially perpendicular to the capillary fibers 34 in each of the chambers. The dialyzate stream flows sinusoidally due to baffles 22, 24, and 26, while the dialyzate containing the urea and creatinine removed from the blood by passage of the creatinine and urea through the walls of the capillary fibers 34 is withdrawn from a tapered dialyzate chamber 36 and removed through dialyzate outlet 16.

My baffle elements have been illustrated as generally parallel in arrangement; however, it is recognized that such elements may take a variety of positions, shapes and designs, and in particular, such elements may all, or some, include or contain one or more circular holes, slots or flow passages therein in order to reduce flow resistance and to permit further cross-flow of the dialyzate stream; for example, as shown in FIG. 5.

Further, my invention also overcomes the deficiencies of increased resistance and lower velocity with distance from central tube distributors by providing uniform flow channels which maintain dialyzate velocity throughout the capillary bed.

The terms "permeate-rich" and "perceate-lean" have been used to designate the component streams after permeation of one or more components through the membrane capillary walls. As is recognized in the dialysis of blood, the concentration of the permeate components in the dialyzate or sweep solutions on entry may range from zero to a concentration less than the components in the blood introduced. As the dialyzate leaves the dialyzer as a permeate-rich stream, it has a permeate concentration greater than that with which it entered but still less than the concentration of the entering blood. As the blood leaves the dialyzer as a permeate-lean stream, it has a permeate concentration lower than that with which it entered. However, the permeate concentration in the blood leaving may be greater or less than the permeate concentration in the dialyzate leaving depending on the overall flow pattern and efficiency of the dialyzate.

My invention has been illustrated with a shell element having a square or rectangular cross section, but other shell element geometries may be used. The principal advantage of a square or rectangular cross-sectional shell element is that all the capillaries of a single dialyzer may be laid into the chambers of the shell element to fill the chambers. A hardenable resin is then applied as a potting compound to the ends of the shell, the compound hardened, the hardened compound severed to expose the capillary ends, and the shell element enclosed by sealing the fourth side onto the shell. A cylindrical shell element may be baffled in accordance with my invention, but does not present the ease in fabrication or design as does the straight sided designs. For example, in filling a cylindrical shell element, half of the capillaries are laid down in each of two half-shell elements. The subsequent sealing of these shells often permits a gap in the capillary bed across the sealing diameter which often permits undesired dialyzate by-passing of the capillaries.

My invention has been illustrated in its preferred embodiment with the baffle elements parallel to the capillary fibers to provide sinusoidal flow; however, tortuous and particularly sinusoidal flow of the dialyzate may be accomplished by other means which are within the scope of my invention. For example, the capillary fibers may be arranged in a desired undulating form, such as sinusoidal pattern within a shell element, and the dialyzate passed in axial flow over such capillaries, which dialyzate will not be in cross-flow with respect to such capillary fibers. In another embodiment, baffle elements are employed perpendicular to the capillary fibers. The dialyzate would then flow in a sinusoidal pattern in a direction parallel to the capillary fibers. Such a design is particularly advantageous, since it would permit overall countercurrent flow; i.e., the blood within and the dialyzate without the capillary fibers moving countercurrent, combined with cross-flow of the dialyzate in each chamber. These and other modifications, as will be apparent to a person skilled in the art, are within the scope of my invention as set forth in the appended claims.

I claim:

1. In a crossflow capillary membrane device suitable for use as an artificial kidney, which device comprises in combination: a shell element; a plurality of capillary membrane fibers disposed in the shell, the fibers arranged generally parallel to each other, the fibers defining a feed zone and a permeate zone, the material of the fiber wall adapted to separate a feed stream into permeate-rich and a permeate-lean fraction; means to introduce a feed stream into the feed zone; means to withdraw a permeate-lean fraction from the feed zone; means to withdraw a permeate-rich fraction from the permeate zone; and means to introduce into the permeate zone a fluid sweep stream to permit the flow of the sweep stream about the capillary fibers, the improvement which comprises:

baffle means to include a plurality of baffle elements disposed within the shell, the baffle elements dividing the shell into two or more chambers, the baffle elements disposed in a substantially parallel arrangement to each other and the capillary fibers, each chamber containing a plurality of capillary fibers and being in fluid-flow communication with the other chambers, the baffle elements disposed to permit the fluid sweep stream to move in a generally tortuous path as it moves in a crossflow direction sequentially through the chambers within the shell element.

2. The capillary device of claim 1 wherein the baffle elements extend in an alternating manner from opposing walls of the interior of the shell element, the elements spatially separated from the opposing interior wall of the shell element, and dividing the interior of the shell element into a series of generally uniform chambers.

3. The capillary device of claim 1 wherein the baffle elements extend to the opposing wall of the shell element and are characterized by a plurality of flow passages therein arranged in an alternating sequence to permit a generally tortuous flow pattern for the fluid sweep stream as it moves through the device.

4. The capillary device of claim 1 wherein the shell element is generally rectangular in shape, and the shell element and the baffle elements formed of an integrally molded rigid polymer.

5. The capillary device of claim 1 wherein the means to introduce the fluid sweep stream or the means to remove the permeate-rich fraction or both comprise elongated tapered chamber elements within the shell element to permit the introduction or withdrawal or both of the fluid sweep stream substantially perpendicular to the capillary fibers.

6. The capillary device of claim 5 which includes an elongated tapered inlet chamber adjacent to and extending along the first baffled chamber, and an elongated tapered outlet chamber adjacent to and extending along the outlet to the last baffled chamber, the inlet chamber tapered to decrease in dimension from one to the other end of the shell element, and the outlet chamber tapered to increase in dimension from one to the other end of the shell element.

7. The capillary device of claim 1 wherein the means to introduce a feed stream comprises a means to introduce the feed stream tangentially into a separate chamber prior to introducing the feed stream into the feed zone, and the means to remove a permeate-lean stream includes a separate funnel-shaped chamber and a central outlet for the removal of a permeate-lean stream axially of the capillary fibers.

8. The capillary device of claim 1 wherein the capillary membrane fibers within the chambers are different in membrane composition, providing a mixture of two or more types of capillary fibers in the device.

9. The capillary device of claim 1 wherein the capillary membrane fibers within at least one of the chambers are different in membrane composition from the fibers in the other chambers.

10. The capillary device of claim 1 which includes means to introduce or withdraw, or both, the fluid sweep stream along the length of the capillary fibers in the chambers and generally uniformly and perpendicular to the capillary fibers.

11. The capillary device of claim 1 which includes means to introduce the feed stream tangentially into an inlet chamber adjacent the open ends of the capillary fibers, and to permit the feed stream to enter the open ends of the fibers, the interior of the fibers defining the feed zone.

12. The capillary device of claim 1 which includes means to withdraw a permeate-lean stream into an outlet chamber adjacent the open ends of the capillary fibers, the interior of the fibers defining the feed zone, and to withdraw the permeate-lean stream generally axially from the outlet chamber.

13. The capillary device of claim 1 wherein the baffle elements divide the shell into three, four or five chambers of substantially equal dimensions, wherein the capillary fibers comprise cellulose acetate, the fibers secured at opposing ends in a hardened resin header with the open ends of the fibers exposed at each end to provide a means to introduce the feed stream at one end, and to withdraw the permeate-lean stream from the other end of the open fibers, the interior of the fibers defining the feed zone and the exterior of the fibers the permeate zone.

14. A crossflow capillary artificial kidney membrane device which comprises in combination:
(a) a generally rectangular shaped shell element;
(b) a plurality of capillary membrane fibers disposed in the shell, the fibers arranged generally parallel to each other, the fibers defining a feed zone and a permeate zone, the material of the fiber wall adapted to separate a blood feed stream into a liquid permeate-rich and a liquid permeate-lean fraction;
(c) means to introduce the feed stream tangentially into a separate chamber prior to introducing the feed stream into the feed zone in the interior of the capillary fibers;
(d) means to remove the permeate-lean fraction which includes a separate funnel-shaped chamber and a central outlet for the removal of the permeate-lean fraction generally axially of the capillary fibers;
(e) inlet means to introduce into the permeate zone a liquid dialyzate sweep stream to permit the crossflow of the sweep stream about the capillary fibers, the means to withdraw and means to introduce both comprising elongated tapered inlet and outlet chambers extending generally from one to the other end of the shell element, and parallel to the capillary fibers to permit the uniform introduction and withdrawal of the liquid dialyzate into the shell element and generally perpendicular to the capillary fibers throughout the length of the fibers;
(f) outlet means to withdraw the permeate-rich fraction and the liquid dialyzate stream from the shell element; and
(g) baffle elements disposed in the shell in a spaced parallel arrangement dividing the shell into two or more chambers, each chamber containing a plurality of capillary fibers and being in fluid-flow communication with the other chambers, the baffle elements substantially parallel to the capillary fibers and so disposed to permit the liquid sweep stream to assume a generally tortuous flow pattern as it moves in a crossflow direction sequentially through the chambers and about the exterior of the capillary fibers.

15. In a process for the separation of a multicomponent liquid feed stream into a permeate-rich and a permeate-lean liquid stream by a membrane device, the process comprising: introducing a liquid feed stream into the interior of a plurality of generally parallel capillary fibers positioned within a shell element, the walls of the fibers defining a feed zone interior of the fibers and a permeate zone exterior of the fibers; withdrawing a permeate-lean liquid stream from the interior of the fibers; passing a liquid sweep stream over and exterior of the capillary fibers; and withdrawing a stream comprising the liquid sweep stream and the permeate-rich stream, the improvement which comprises:
(a) employing a plurality of baffle elements to divide the shell element into two or more chambers, each of the chambers containing the capillary fibers, the baffle elements positioned substantially parallel to the capillary fibers and to each other, the chambers in liquid-flow communication with each other; and
(b) flowing the liquid sweep stream in a cross-flow direction substantially perpendicular to the capillary fibers and sequentially through the chambers.

16. The process of claim 15 which includes flowing the liquid sweep stream substantially uniformly and perpendicular to the capillary fibers along substantially the entire length of the capillary fibers in the shell.

17. The process of claim 15 which includes introducing the liquid sweep stream into an elongated tapered inlet chamber extending generally the length of the capillary fibers in the baffled chambers, the inlet chamber decreasing in dimension from the inlet to the opposite end of the inlet chamber to permit the introduction of the liquid sweep stream substantially uniformly and perpendicular along the length of the capillary fibers.

18. The process of claim 15 which includes withdrawing the liquid sweep stream and the liquid permeate-rich stream after flowing through the baffled chambers from an elongated tapered inlet chamber extending generally the length of the capillary fibers in the baffled chambers, the outlet chamber increasing in dimension from the opposite end to the outlet to permit the withdrawal of the liquid sweep stream substantially uniformly and perpendicular along the length of the capillary fibers.

19. The process of claim 15 which includes introducing the liquid feed stream to be separated tangentially into an inlet chamber adjacent the open ends of the fibers and in liquid-flow communication with the open ends of the interior of the capillary fibers, and introducing the feed stream into the feed zone from such chamber.

20. The process of claim 15 which includes removing the permeate-lean stream by withdrawing the stream from the interior of the capillary fibers into an outlet chamber adjacent the open ends of the fibers and in liquid-flow communication with the open ends, and removing the liquid permeate-lean stream from the outlet chamber through an outlet in the chamber disposed generally axially of the capillary fibers.

21. The process of claim 15 which includes employing capillary membrane fibers within the chambers, which fibers are different in membrane composition within at least one chamber.

22. The process of claim 15 wherein the liquid feed stream comprises blood, wherein the capillary membrane fibers are adapted to permit the removal of urea and creatinine from the blood introduced into the interior of the fibers by a permeation process, and wherein the liquid sweep stream comprises an aqueous dialyzate solution.

23. In a process for the separation of a multicomponent liquid feed stream into a permeate-rich and a permeate-lean liquid stream by a membrane device, the process comprising: introducing a liquid feed stream into the interior of a plurality of generally parallel capillary fibers positioned within a shell element, the walls of the fibers defining a feed zone interior of the fibers and the permeate zone exterior of the fibers; withdrawing a permeate-lean liquid stream from the feed zone; passing a liquid sweep stream over and exterior of the capillary fibers; and withdrawing a stream comprising the liquid sweep stream and the permeate-rich stream, the improvement which comprises:
(a) employing a plurality of baffle elements to divide the shell element into two or more chambers, each of the chambers containing capillary fibers, the baffle elements positioned substantially parallel to the capillary fibers and to each other, the chambers in liquid-flow communication with each other;
(b) introducing the liquid feed stream to be separated tangentially into an inlet chamber adjacent to and in liquid-flow communication with the open ends of the interior of the capillary fibers, and then introducing the liquid feed stream into the feed zone;
(c) introducing and distributing the liquid sweep stream substantially uniformly along the entire length of the capillary fibers in the chambers and substantially perpendicular to the capillary fibers;
(d) flowing the liquid sweep stream in a tortuous crossflow direction about the exterior of the capillary fibers and substantially perpendicular to the fibers and sequentially through the chambers;
(e) withdrawing the liquid sweep stream and permeate-rich stream from the last sequential chamber in the shell element and substantially uniformly along the length thereof and perpendicular to the capillary fibers; and
(f) removing the permeate-lean stream by withdrawing the stream from the feed zone directly into an outlet chamber adjacent the open ends of the fibers and in liquid-flow communication with the open ends of the fibers, and removing the liquid permeate-lean stream from the inlet chamber through an outlet disposed generally axially of the capillary fibers.

24. A method of manufacturing a capillary fiber device, which method comprises:
(a) providing a generally rectangular type shell having one side thereof open, the shell including a plurality of parallel baffle elements therein dividing the shell into a plurality of separate chambers, the chambers in fluid-flow communication with each other so as to permit a fluid stream to flow sequentially through the chambers in a generally tortuous flow path, the baffle elements extending less than the length of the shell at each end of the shell;
(b) laying a plurality of capillary fibers in each baffled chamber, the fibers arranged generally parallel to each other and to the baffles;
(c) applying a hardenable resin as a potting compound about each end of the capillary fibers in the shell;
(d) hardening the resin about the fiber ends;
(e) severing the hardened resin at each end to expose the open ends of the capillary fibers hardened therein, and to form chambers within and at each end of the shell, the open ends of the fibers in the resin forming one wall of each such chamber; and
(f) sealing a side element onto the open side of the shell to form an enclosed fluid-tight capillary fiber device.

References Cited

UNITED STATES PATENTS

| | | | |
|---|---|---|---|
| 3,228,877 | 1/1966 | Mahon | 210—22 |
| 3,019,853 | 2/1962 | Kohman et al. | 55—158 X |
| 3,547,271 | 12/1970 | Edwards | 210—321 |

FRANK A. SPEAR, JR., Primary Examiner

U.S. Cl. X.R.

210—23, 321, 456; 264—258, 277